(12) United States Patent
Tanouye et al.

(10) Patent No.: US 7,703,788 B2
(45) Date of Patent: Apr. 27, 2010

(54) FORCE CHANNELING MOUNTAIN BIKE REAR SUSPENSION

(76) Inventors: Ted K. Tanouye, 1341 W. Baker Ave., Fullerton, CA (US) 92633; Alan H. Kang, 2140 S. State Collage Blvd., Apt. 3015, Anaheim, CA (US) 92805

( * ) Notice: Subject to any disclaimer, the term of this patent is extended or adjusted under 35 U.S.C. 154(b) by 0 days.

(21) Appl. No.: 12/098,399

(22) Filed: Apr. 4, 2008

(65) Prior Publication Data
US 2009/0250897 A1 Oct. 8, 2009

(51) Int. Cl.
*B62K 3/02* (2006.01)
(52) U.S. Cl. ..................................................... 280/284
(58) Field of Classification Search ................. 280/284
See application file for complete search history.

(56) References Cited

U.S. PATENT DOCUMENTS

| | | | | |
|---|---|---|---|---|
| 5,611,557 A * | 3/1997 | Farris et al. | ................ | 280/275 |
| 6,036,213 A * | 3/2000 | Busby | ................ | 280/284 |
| 6,131,934 A * | 10/2000 | Sinclair | ................ | 280/284 |
| 6,581,950 B1 * | 6/2003 | Ellsworth | ................ | 280/284 |
| 7,100,930 B2 * | 9/2006 | Saiki | ................ | 280/284 |
| 7,350,797 B2 * | 4/2008 | Carroll | ................ | 280/284 |
| 7,392,999 B2 * | 7/2008 | O'Connor | ................ | 280/284 |
| 7,467,803 B2 * | 12/2008 | Buckley | ................ | 280/283 |
| 7,494,146 B2 * | 2/2009 | Tseng | ................ | 280/284 |
| 2005/0184483 A1 * | 8/2005 | Buckley | ................ | 280/284 |
| 2006/0071442 A1 * | 4/2006 | Hoogendoorn | ................ | 280/275 |

* cited by examiner

*Primary Examiner*—Kevin Hurley
*Assistant Examiner*—Daniel Yeagley (57) ABSTRACT

An innovated rear suspension system for mountain bikes that includes five structural tubes—a force channeling tube, a front stabilizing tube, a rear stabilizing tube, a top tube, and a seat tube—connected to form an irregular polygon; reinforced with gussets, a torque conversion device pivotally connected to a compression strut, a shock-absorbing element and the force channeling tube, which transfers force or shock from the compression strut to the shock-absorbing element. The shock-absorbing element pivotally connected at the front to a pair of shock mounts attached to the force channeling tube absorbs and compresses force from the torque conversion device and transfers the force to the force channeling tube. The upward and forward direction of the force channeling tube guides the force along the force channeling tube propelling the bicycle and the rider forward, reducing jacking and efficiently utilizing pedal forces.

9 Claims, 5 Drawing Sheets

FORCE CHANNELING MOUNTAIN BIKE REAR SUSPENSION

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION i. Technical Field

The present invention relates to mountain bike rear suspension systems, specifically a rear suspension system that is integrated into the design of a mountain bike frame.

ii. Background Art

Bicycles designed to traverse rugged terrain, commonly known as mountain bikes, have been available for many years. An increasingly common feature of mountain bikes is their rear suspension systems. The rear suspension system prevents certain forces from being transferred by the terrain, against the bike, to the rider. It also increases rider control by maximizing tire contact with the terrain.

Mountain bike rear suspension systems that use shock-absorbing elements have placed great emphasis on correcting the problem of "jacking." According to Horst Leitner, as detailed in U.S. Pat. No. 5,899,480, "jacking" occurs because of the design of "swingarm" rear suspension systems. "In simple swingarm rear suspension, the swing arms pivot sharply upward when a surge of power is supplied to the rear wheel, and pivot downward again when the power is backed off." When a mountain bike is ridden over rough terrain, this "jacking" can reduce the contact of the rear wheel with the riding surface, which can severely compromise the rider's control over the bike. "Jacking further reduces performance because the upward movement of the rear wheel results in a dissipation of power that might otherwise go to forward propulsion of the bike. Such losses may be of little consequence for a motorcycle, but are intolerable to a bicyclist seeking peak performance." Id.

In an attempt to remedy the "jacking" problem, Leitner, in U.S. Pat. No. 5,899,480 (commonly referred to as a "horst link"), proposes that by locating the chainstay's pivot axis in front and below of the rear axle will cause a resistance to chain-induced "jacking," because additional torque will be created to counteract other torques. However, in U.S. Pat. No. 6,926,298, Anthony Ellsworth argued that "horst link" style bikes fail to cancel pedal induced and suspension induced forces directly, thereby resulting in shock binding and decreased suspension activity. Ellsworth also explained that "horst link" style bikes provide a weaker foundation for the suspension of a bicycle, because the shock absorber shaft acts as a major structural member of the linkage, resulting in an extremely flexible bicycle frame. A weak structure decreases rider stability as the alignment of forces by pedaling and suspension activity is crucial to maintain traction, pedaling efficiency, and an active rear suspension (especially at high speeds).

In addition, as evidenced in U.S. Pat. No. 6,926,298, Leitner's "horst link" design attaches the shock absorbing element, or the link that activates the shock, directly onto the seat tube of the bicycle. The seat tube is not only a weaker structural member of the bike, but it limits the length of the bicycle's rear suspension components. Since the rear suspension is usually made up of upper arm members and another device (such as Specialized's links, or Ellsworth's rocker arms), attaching these links, rocker arms, or torque conversion devices onto the seat tube directly effectively limits the length of the rear suspension, compromising the suspension's ability to maintain traction and track terrain under extreme or fast riding situations.

Leitner overlooked the importance of aligning forces imparted onto the rear tire on stronger structural areas of the bicycle frame to achieve greater rider stability and control. In order to remedy the shortcomings of Leitner's "horst link," Ellsworth proposes a new suspension design called "Instant Center Tracking Technology" or "ICT," U.S. Pat. No. 6,926,298. Whereas Leitner's design did not focus on the proper alignment of forces channeled throughout the bicycle's frame, or on the rear suspension as being critical for proper activation of the suspension, Ellsworth's design somewhat recognized the importance of force alignment for the proper functioning of the rear suspension.

Ellsworth theorizes that configuring a rear wheel suspension system to track a chain line with an instant center—defined as the intersection point of two imaginary lines drawn through the pivot points of the upper and lower rocker arms—relieves brake induced torque and pedaling power loss due to drive torque induced suspension movement. However, the configuration Ellsworth recommends requires the shock absorbing element to be placed between the lower and upper rocker arms; therefore, it is positioned near or on the seat tube and is mounted vertically. It is aligned with a weaker element of the bike's structure and the shock forces travel vertically. At high speeds, where small forces imparted on to the bike are magnified, such a configuration could only result in instability. The only way to remedy such a situation would be to add additional weight to the bike in the form of thicker, thus stronger, material to counteract the magnified forces, thereby reducing rider performance because of the additional energy required to travel the same distance with a heavier bicycle. Ellsworth's long-travel bikes, which have higher demands for stability at high speeds versus lower-travel cross-country style bikes, weigh approximately 20 percent more than similar bikes in its class.

Additionally, in these prior designs, forces are imparted onto the seat tube (or any other area of the main frame that are not properly aligned with the angle of a key structural member of the frame), which create forces on the bike that work against the forward propulsion induced by pedaling.

The advantages of reducing forces induced by a rider's motion of pedaling in "horst link" style bikes have since been proven irrelevant by advances in rear shock technology pioneered by companies like Manitou, Fox, and 5$^{th}$ Element. For example, Fox's ProPedal™ damping system design allows compression tuning which gives the right amount of low speed compression to filter out unwanted rider induced pedal bob without sacrificing critical mid and high speed damping—reducing energy absorbing suspension movement and increasing pedaling efficiency. Thus the advances of previous designs are eclipsed and have become outdated.

The original intent behind the "horst link" was to lessen the effect of brake induced "jacking." Since the 1990's, bikes relied on rim brakes to stop forward rider and vehicle impetus which, due to the location of the rim brake mounting being so far from the center of the rear axle, meant that the force of braking would cause the suspension to "jack," as the entire rear end pivoted around the main pivot point (adjacent to the bottom bracket). The "horst link" greatly lessened this effect by successfully disconnecting the seat stays from the equation.

Additionally, the "horst link" fixed the problem of suspension "squatting." Suspension "squatting" occurs when tension is applied to the chain through pedaling, which makes the suspension "squat" as it tries to pull the rear axle toward the bottom bracket. In 2005, when most full suspension mountain bikes had disc brakes, the need for the "horst link" was non-existent, because the braking force was applied significantly closer to the rear axle, which resulted in their being no suspension "jacking," and no chain torque suspension "squatting."

Further reduction of the shocks occurs when torque from the crank arms is converted into tension on the chain. This tension serves to drive the rear wheel. Assuming the rear wheel is under a heavy binding force of friction between attached tires on even ground, the tension would direct itself into the rear axle. If the forces are not aligned with a structural member of the frame, the rear wheel would be driven upwards, compressing the shock absorber, and thus reducing its ability to absorb impact from the terrain-decreasing the performance of the bike. This motion is described as chain torque induced suspension squatting, which was eliminated shortly after the "horst link" was invented, because it lifted the main pivot point from adjacent to the bottom bracket to more in line with the point of tangency with the smallest chain-ring attached to the crank arms, thereby increasing pedaling efficiency.

However, Amps got their reputation as great peddlers not because of the design of their suspension and pivot but because of the design of their shock element (spring or air), which incorporated a stable platform and compression-damping circuit into its design. Users simply assumed FSR designs with the same designer—being essentially carbon-copes of prior Amp designs (Horst designed the original FSR and Ground Control A1 designs, and the later FSRs were basically beefed up copies of the Amp B-4 and B-5 designs)—would automatically pedal with equal performance. Unfortunately Specialized chose to incorporate different shocks (Produced by RST and Fox) rather than utilizing something produced by Amp-Research (Amp did make shocks and rear suspension parts for other companies such as Fat Chance and Dagger). The shocks utilized lacked the stable pedal damping characteristics, which were later developed.

Early designs into counter drive train induced shock compression focused exclusively on frame design. Designers invented the unified rear triangle (URT), the virtual pivot point (VPP), and single-pivot bikes with the pivot above the point of tangency with the chain and chain-ring attached to the crank arms. (The intention being that chain torque impends the wheel downwards, extending the shock.) The most inefficient designs use manual-lockouts on the shocks themselves. Indeed, lockout-equipped Fox suspension was used on many models of the FSR XC's spanning several years. The irony is, while FSR's were complimented for being able to respond to relatively small forces notably well, Amp designs were criticized for failing to respond to those same small forces—because the stable pedal compression damping circuit they used isolated small movements (i.e. small bumps). How did the circuit work? A spring-loaded ball bearing located inside the thru shaft of the shock prevented oil from flowing from one chamber to the next, causing the pressure to overcome the spring pressure inside the shock, unseating the bearing, and allowing the oil to flow freely. Once the oil pressure spiked, the shock compressed fine (and is another reason why Amp designs always used external coil-spring shocks, even though a shock absorber utilizing a pressurized air chamber in place of a coil-spring, like those made by Risse, might have been lighter). Amp also had a titanium spring option for their shock absorbers, which removed nearly a pound from the coil-sprung weights, though it incurred an additional expense. Early Amp shocks had a fixed internal-spring setting on the compression damping. Later models (those around 1995 when the change was made) received an adjustable damping with an external preload for the spring, which allowed the rider to time how soon the circuit opened and thus how reactive it was to small bumps as well as to forces from pedal inputs.

Later generation shock designs incorporated a larger diameter shock body (requiring a change to the seat strut assembly as well, because they were not backwards compatible with the previous struts), which had a greater oil capacity and greater fluid retention integrity. Because the peak oil pressures weren't as high inside the thru shaft body, the user was presented with fewer problems of oil leaking past the installed seals. As previously mentioned these advances outdated prior art designs intending to reduce pedal bob.

The above highlights previous deficiencies and inadequacies of rear suspension for bicycles and frame design. All of these designs heretofore known suffer from a number of disadvantages:

(a) Both "horst link" and FSR designs require more intensive manufacturing to work around an uninterrupted seat tube and seat mast to mount a shock-activating link on the seat tube. This is due to the shape of the frame, which requires the seatpost to be constructed of two separate elements. Thereby increasing the time needed to manufacture and assemble the components of the frame. This increases the cost of manufacturing and decreases the efficiency of workers and use of materials resulting in products that are less capable of bearing profit.

(b) FSR designs utilize a link system, which is innately defective; it is not engineered to be a structurally significant member of the frame thus creating a weak element. The shock in these designs is mounted to the frame by a means of an attached throughshaft, where one end of the shock rests and is bolted to the opposing side of the frame. This throughshaft is suspect and is the weak element of the frame mentioned above. The stresses applied to this component fail to make use of the tinsel strength of the metal (greatest) instead relying on its inferior rigidity and ability to resist bending. Because of its relatively thin composition it is cursed by a weak nature and is prone to fatigue resulting in the failure of the frame.

(c) Prior art provides no support conduit for the forces impounded by the rider and the ground to be completely channeled into a load bearing structure. Prior art frame design is centered on the negation of forces by counterforces; weak elements are supported by others. This requires an excessive amount of material to be utilized in the frame. Thus the weight of the frame is increased, as well as the material and manufacturing cost.

(d) Use of a gusseted downtube to facilitate the properties of force channeling is absent from prior art. No prior art uses a gusseted downtube to reduce the need for bracing, thus requiring that extra bracing be integrated into the frame design. Incurring additional weight, material and manufacturing costs.

(e) All prior art designs suffer from extraneous movement thus inducing fatigue of components reducing their integrity. The prior art designs fail to counter these forces thus allowing them to affect the performance of both user and frame. This unsatisfactory performance decreases the desirability of such frames to the consumer market.

(f) Placement of the pivot point in prior art is such that it is not capable of bearing significant loads creating a weak element in the frame design. Though varied in position, all prior art neglects the ability of a frame to channel forces and thereby incur extra weight in their designs and the aforementioned disadvantages.

SUMMARY OF THE INVENTION iii. Disclosure of Invention

The principle objects and advantages of the present invention are to provide a lightweight mountain bike frame and force channeling rear suspension system that affords the rider with maximum performance through the elimination of extraneous forces, thereby creating a smooth ride for the user and extending the lifetime of the frame by reducing vibration inducing metal fatigue.

The forgoing objects and advantages can be accomplished by combining a frame that is both strong and lightweight with a rear suspension system that channels suspension forces to a parallel structure—which has not been done in any of the above-mentioned art. The main frame is composed of welded aluminum tubing that has been heavily reinforced with open-ended gussets. The design advantage being that peak stress is directed away from the vertical axis of the tubes and towards the more lightly loaded sidewall areas. The seat tube sits at a 72-degree angle to better accommodate all mountain riding.

The present invention uses a 150 mm travel four-bar linkage, which places the rear pivot on the chainstay near the rear axle. The rocker link is connected to the down tube on the bike rather than on the seat tube. In doing so, the center of mass on the bike is centralized and also connects the rocker link to the strongest tube on the frame. Open-ended gussets are used on the head tube and seat tube in order to help evenly distribute stress. There are 14 CNC-machined parts on the frame, including the rocker link, which uses dual bearings on the main pivot for increased later stiffness and lifespan. The rear end features sealed bearings at the pivot points and the compression yoke features a rib that adds torsional rigidity to the rear end. The bottom bracket shell is inverted where the chain stays connect, meaning the stays connect on the inside of the tabs rather than the outside. This adds stiffness to the bottom bracket area.

To eliminate extraneous forces, the upper shock link is placed at an obtuse angle, thereby conducting the majority of force along the running axis of the channeling tube, which will be translated into the channeling tube via the upper shock link bolt. The upper shock link bolt runs perpendicular to the running axis of the channeling tube. Any lateral flex in the rear suspension assembly will cause the upper shock link to want to flex in the direction of the running axis. The upper shock link's impulse to flex under such loads will be thwarted by the natural tendency of the channeling tube to resist compression and tension in its running axial direction.

By locating the stabilizing tube near a perpendicular angle to the upper shock link, any upward force in the rear axle will induce a rear and downward force on the upper shock link pivot, which is mounted between the junction of the stabilizing tube and channeling tube. The resulting force will be channeled as close to parallel along the running axis of the stabilizing tube. The inherent strength of the stabilizing tube in its running axial direction will counter act the force. In the event that the upward force upon the rearward axle cannot be fully matched by the damping reaction of the shock absorber (commonly referred to as "bottoming"), and the suspension system is at the end of its cycle, the upper shock link becomes perpendicular to the stabilizing tube. The impulse (defined as the magnitude of a force multiplied by the amount of time it is applied) of this force will be transferred directly into the stabilizing tube along the running axis by the perpendicular upper shock link. At the same time, the same force will be applied upon the shock absorber. That force will be transferred to the shock mount and thus be parallel to the running axis of the channeling tube, utilizing the maximum strength of the frame. This allows the frame to be constructed of a lighter material, which decreases its overall weight and increases the performance of the bike.

Furthermore, the present invention differentiates itself in that it makes use of knowledge of forces and how they travel through a metal frame and are thus supported, which effectively reduces the need for additional supports to counter extraneous forces creating a lighter bike of equal or greater strength and inherently greater integrity. Additionally, force channeling prevents forces impounded on the frame from causing extraneous movements or vibrations, eliminating unnecessary metal fatigue. Moreover, placement of the pivot point is such that it is capable of bearing significant loads, eliminating it from the list of traditionally weak frame components.

OBJECTS AND ADVANTAGES

Several objects and advantages of the present invention are:
a) Forces imparted upon the rear wheel are transferred to a shock-absorbing element that is aligned with the force channeling tube, the strongest load-bearing axis, which improves strength and stability as well as control over the bike.
b) The forward-facing alignment of the force channeling tube and shock absorbing element causes forces absorbed by the suspension, including pedaling forces, to assist forward movement of the bike.
c) The swing arm pivot point is located such that the lower arm pivot point is situated rearward of and below the horizon of the crank axis. This configuration isolates the suspension movement from pedal forces, largely reducing jacking.

DESCRIPTION OF PREFERRED EMBODIMENTS

As will appear in the description following, a person of ordinary skill can by inspection of the drawings ascertain a full description of the invention and of how to make and use it. Preferred embodiments are here described, beginning with a brief description of the drawings.

DRAWINGS

| DRAWINGS - REFERENCE NUMERALS FOR FIGS. 1-4 | |
|---|---|
| 1 | FRONT PORTION OF FORCE CHANNELING TUBE |
| 2 | HEAD TUBE |
| 3 | TOP TUBE |
| 4 | TOP PORTION OF SEAT TUBE |
| 5 | BOTTOM PORTION OF SEAT TUBE |
| 6 | REAR PORTION OF FORCE CHANNELING TUBE |
| 7 | UPPER ARMS OF REAR TRIANGLE |
| 8 | LOWER ARMS OF REAR TRIANGLE |
| 9 | TORQUE CONVERSION DEVICE |
| 10 | FRONT PIVOT OF TORQUE CONVERSION DEVICE |
| 11 | REAR PIVOT OF TORQUE CONVERSION DEVICE |
| 12 | PIVOT |
| 13 | BOTTOM BRACKET PIVOT |
| 14 | BOTTOM BRACKET |
| 15 | SHOCK MOUNT |
| 16 | MAIN PIVOT OF TORQUE CONVERSION DEVICE |
| 17 | SHOCK MOUNT |
| 18 | FRONT GUSSET OF TORQUE CONVERSION DEVICE |
| 19 | SEAT POST GUSSET |
| 20 | HEAD TUBE GUSSET |
| 21 | SHOCK ABSORBER |
| 22 | DROPOUT |
| D1 | LENGTH OF FORCE CHANNELING ABSORPTION |

Figure 5:
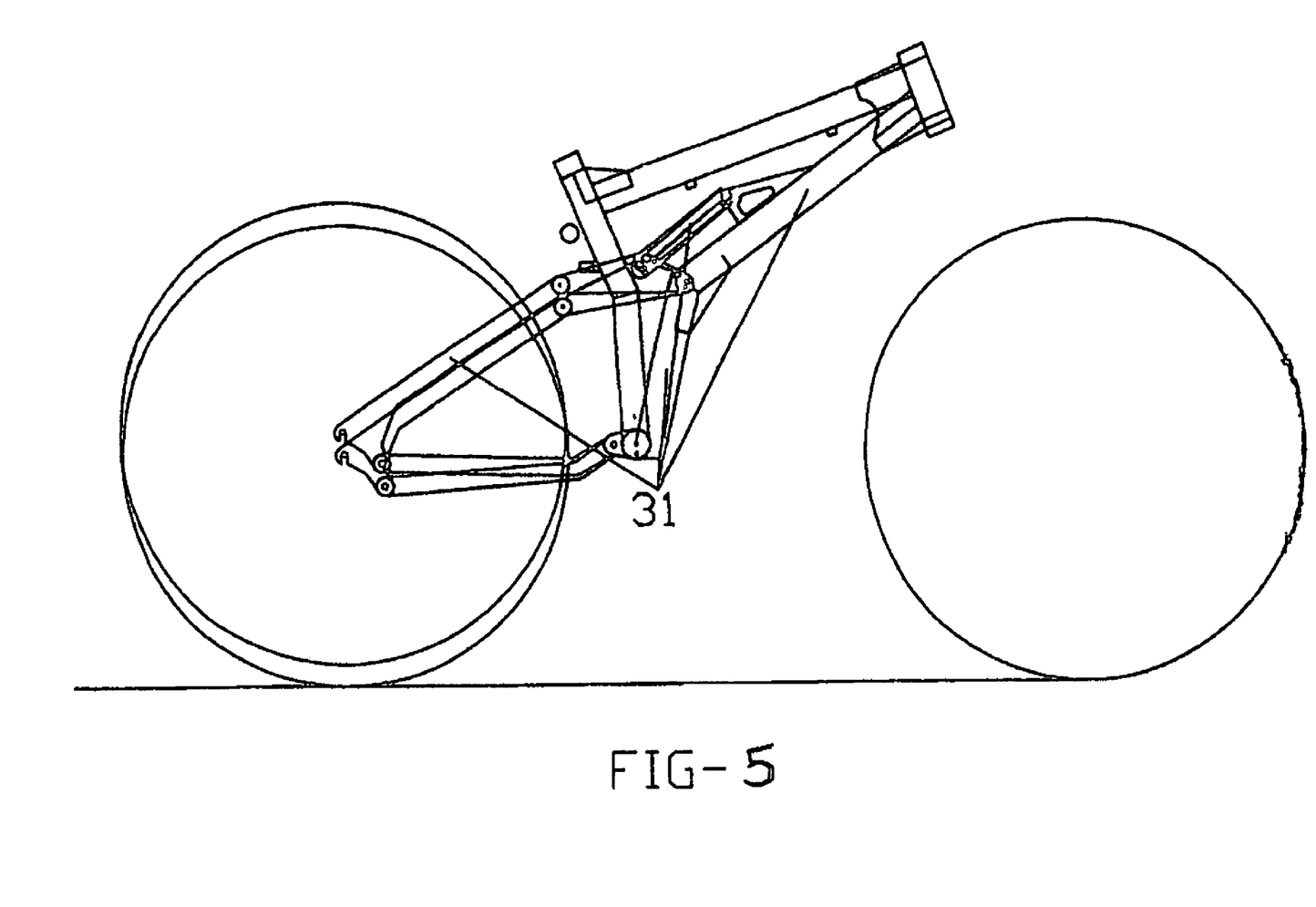
FIG. 5 is a diagram showing the forces exerted on the entire chassis while the shock absorber is in a compressed position.

Reference Numerals for FIG. 5

31 Key areas of force centralization

BEST MODE OF CARRYING OUT THE INVENTION

Figure 1:
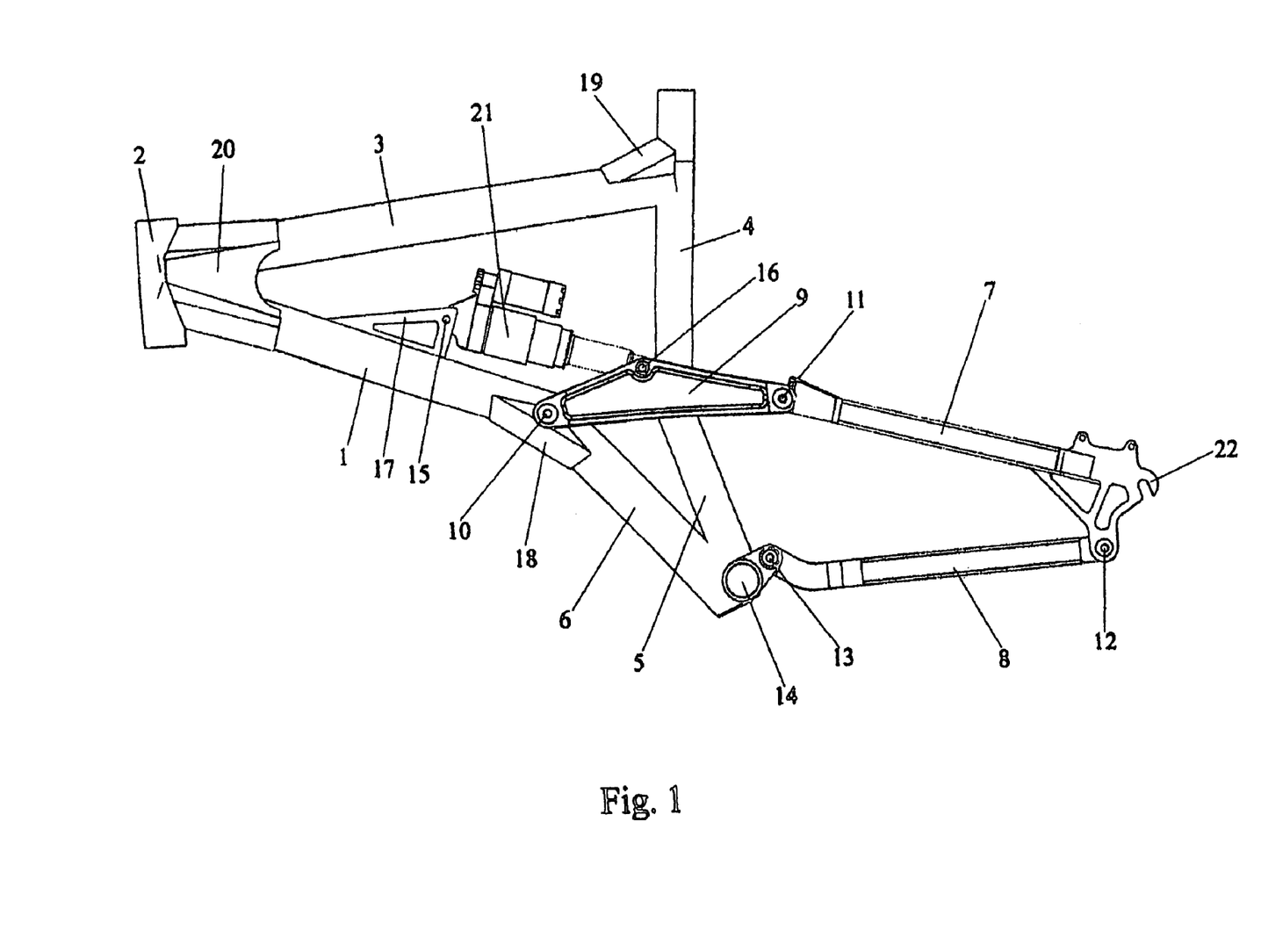
FIG. 1 is a diagram showing the side view of the frame utilizing force-channeling centralization with the shock in an uncompressed position.
Figure 2:
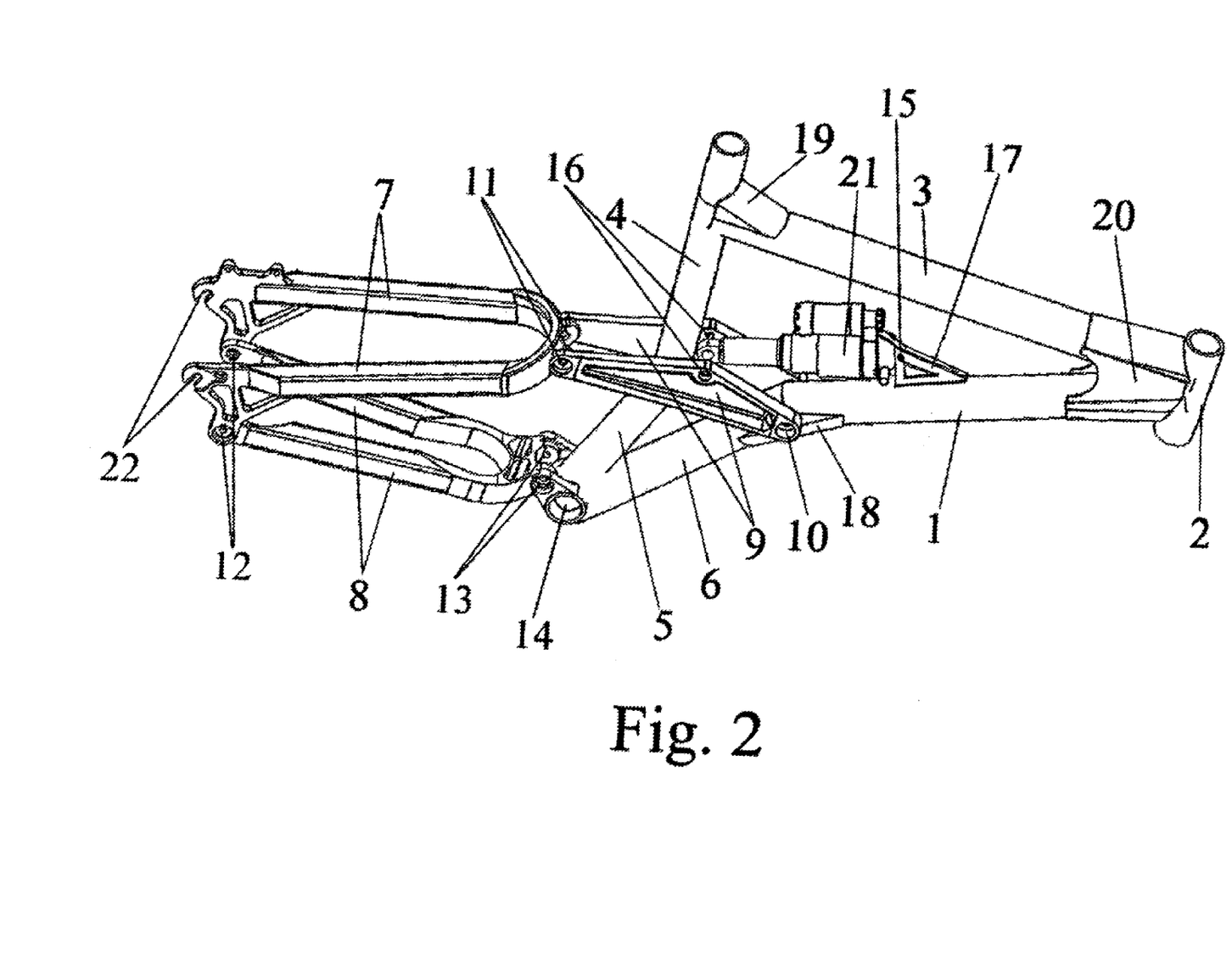
FIG. 2 is a diagram showing the angles crucial to reaping the benefits of force-channeling centralization in a frame design while the shock absorber is in an uncompressed position.
Figure 3:
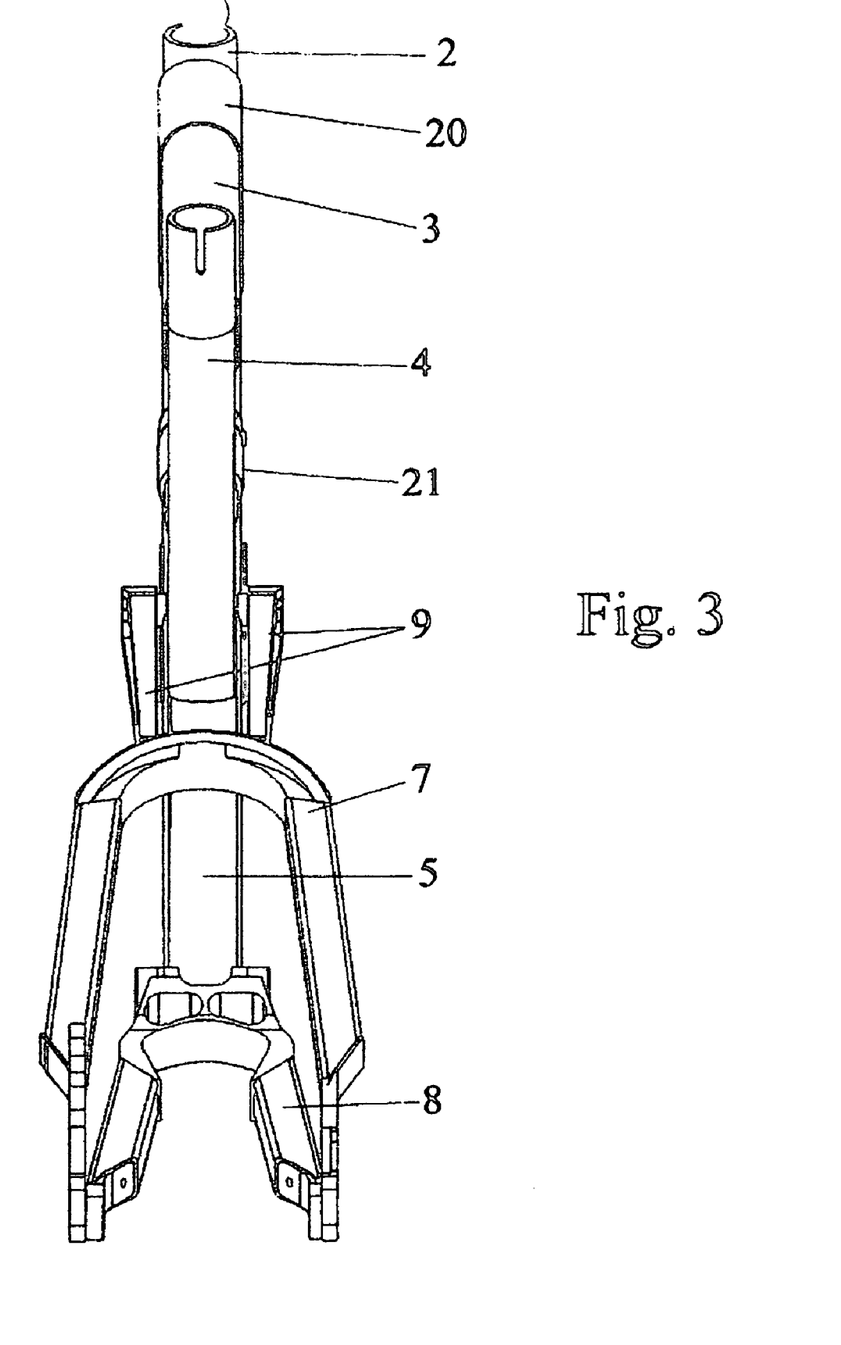
FIG. 3 is a diagram showing the rear view of the frame utilizing force-channeling centralization.

FIGS. 1-3—Preferred Embodiment

A preferred embodiment of the FORCE CHANNELING MOUNTAIN BIKE REAR SUSPENSION system and frame design is illustrated in the accompanying FIGS. 1-5. The frame is constructed of rigid aluminum tubing welded together. A shock absorber 21 is used to allow compression of the frame under force.

With reference to FIGS. 1, 2, and 3, paired right and left lower arm members 8, of which only the right one appears in all mentioned figures, are pivotally attached to the bottom bracket area 14. The main pivot point 10 attaches to the channeling tube running axis 1, with the tube further reaching the bottom bracket area 14 by means of the channeling tube running axis 6. All such that the upper arms 7 are pivotal about lower arm pivot axis 13. Paired right and left upper arm members 7, of which only the right one appears in the mentioned figures, are pivotally attached to respective right and left lower arm members 8 such that they are pivotal about rear pivot axis 11 (on the torque conversion device). The lower ends of the upper arm members 7 pivotally attached to the lower arm members 8 by pivot 12. Upper arm members 7 are provided with dropouts 22 of which only the right one appears in the mentioned figures, for receiving a rear wheel axle at hub points located on the hub axis, which is situated to rearward of and at the horizon of rear pivot axis. Where the suspension according to the invention is to be retrofitted onto a conventional main frame, brackets provided with holes or pins for pivotal attachment can be clamped onto the shock mount at the appropriate points. Where the frame is being manufactured with the suspension according to the invention as original equipment, the shock mount can be welded directly to the channeling tube in the manufacturing process.

The lower arm member pivot point can be located such that the lower arm pivot axis 12 is situated below the horizon of the crank axis or on the axle itself or above the axle; and the lower arm pivot axis can be situated rearwardly from the crank axis. Thus allowing the frame to compress as depicted in FIG. 5 imparting forces parallel to the channeling tube's 1 axis of symmetry.

As is apparent from the FIG. 5, the path of movement of the upper ends of upper arm members 7 which are pivotally attached to the lower arm members 8, and torque conversion device 9 and rigidly attached to the rear wheel, the lower arm members 8 which are pivotally attached to the upper arm members 7, base of the stabilizing tubes 1, 6 by means of a pivotal attachment to the torque conversion device 9, is constrained by the telescoping of the shock absorber and by the pivotal movement of the upper element of the shock absorber as the upper and lower arm elements move upward and downward in response to riding surface irregularities or applications of surges of power to the rear sprocket through the drive chain. And the extent of the movement of the upper ends of upper arm members 7, torque conversion device 9 and lower arm members 8 is limited by the strength of resiliency of the shock absorber.

As depicted in the figures, the design incorporates several unique properties that increase the strength of the frame through both force channeling and re-enforcing means. The gussets 20, 19, 18 provide additional support to the welds supporting the stabilizing tubes 4, 5 and channeling tubes 1, 6. The shock mount 17 is welded to the channeling tube 1 and pivotally attached to the shock absorber 21—a high integrity component differentiating it from prior art.

Figure 4:
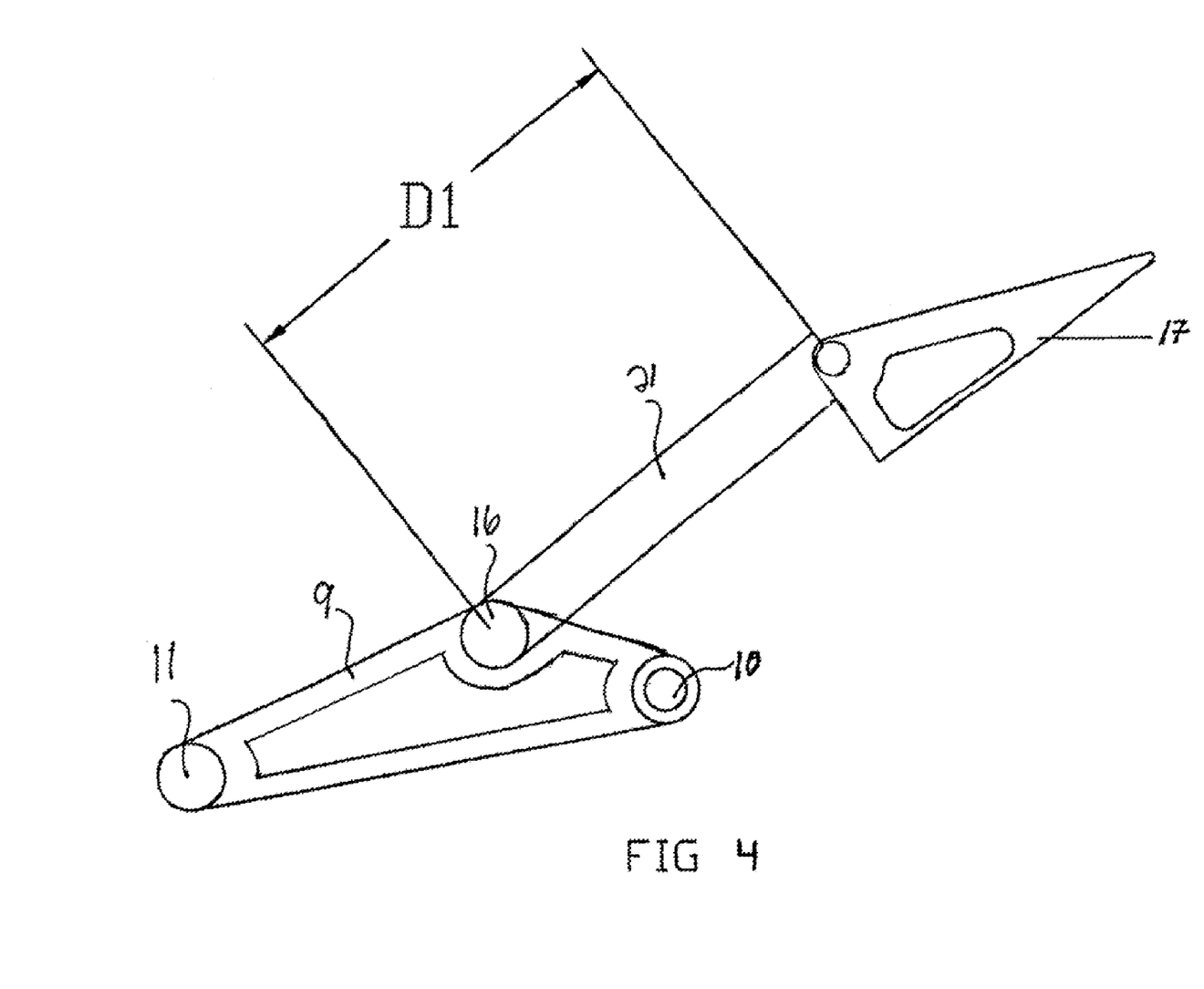
FIG. 4 is a diagram showing the shock absorber aligned with the channelizing tube running axis, which keeps forces parallel to the channeling tube which allows for force channeling from the rear axle as well as centralizing the mass of the shock absorption.

Placement of pivot point 11 at the horizon of the rear axle incurs the forces exerted by the upward movement of the rear wheel to be channeled into the channeling tube running axis. The majority of forces are exerted throughout the torque conversion device 9 to the shock absorber 21. This compression of the shock absorber 21 is shown in FIG. 4, the shock absorber 21 will telescope absorbing the impact from the rear wheel (FIG. 4); the delta of this distance will depend on the force of the impact. The forces then through the shock mount 17 thus they are imparted to the channeling tube 1 parallel to its running axis D1 (FIG. 4), then into the headtube 2. Forces also enter the channeling tube running axis 1 from the torque converter 9 from pivot point 11; also being imparted parallel to its axis of symmetry. Or alternatively from the lower arms 8 through pivot point 13 upward and parallel to the running axis 31 of the stabilizing tube 5 to the channeling tube 6 joining the other forces.

As mentioned above, those members of the frame, which exist in pairs, are intended to pivot together as a unit. That is paired pivots will move with congruent angles. This unitary movement of the paired members about their pivot points ensures that the rear wheel hub axis, the crank axis, and all the pivot axes remain essentially parallel in the entire range of motion the frame is capable of. Certain portions of the paired members can be rigidly united at a particular pivot point. For example, the lower arm members may be fully united at their front ends; the upper arm members likewise at their forward ends; and the torque conversion device may be constructed as a united piece, unless it is a convenience of manufacturing or making an adequate pivot point for the shock absorber 21.

In preferred embodiments, disc brakes are used, and the disc can be mounted on the wheel hubs—where the brake is mounted on the dropout 22. Also, in preferred embodiments, the rear derailleur can be mounted on an upper arm member. Force channeling centralization according to the invention provides for improved safety and performance, by effectively isolating movements of the suspension from pedal forces, to some extent. In addition to maximize the strength of the frame by channeling forces so they are exerted on the soundest part of the frame, there is a reduction of fatigue due to excess vibrations. As a result, the rear wheel is kept for a greater proportion of the riding time in good contact with the riding surface, even when the rider applies bursts of power to the rear wheel through the chain, and even where the riding surface is exceedingly irregular or a substantial impact is absorbed by the frame. The suspension can therefore be used with salutary effect particularly on so-called "mountain bikes" or "trail bikes" where high performance is demanded, as in competitive off-track riding. The present invention provides for lightweight straightforward construction, and can be adapted to any of a variety of standard conventional main frames, so it is suitable for retrofit.

Operation—FIGS. 4 and 5

With reference to FIGS. 4 and 5, while the user is riding the bike over level terrain the forces are channeled into the headtube through the aforementioned means. When the rear wheel encounters a bump the frame is compressed upwards absorbing the impact. The force of the impact is then channeled into the headtube 2 thus the impact in absorbed.

Although the description above contains many specificities, these should not be construed as limiting the scope of the invention but merely providing illustrations of some of the presently preferred embodiments of this invention. For example the frame may be constructed in a variety of sizes; be comprised of a oval, circular or square tubing, take a different shape which still maintains the principle properties of force channeling, etc.

Thus the scope of the invention should be determined by the appended claims and their legal equivalents, rather than by the examples given.

What is claimed is:

1. A mountain bike frame, comprising:
   (a) a force channeling tube comprising front and rear portions joined together at a first intersection, the front and rear portions having front and rear longitudinal axes associated therewith, the rear longitudinal axis being configured at a steeper vertical angle than the front longitudinal axis;
   (b) a seat tube comprising top and bottom portions, the bottom portion being joined to the rear portion of the force channeling tube at a second intersection, the top and bottom portions being joined at a third intersection;
   (c) a rear triangle comprising upper and lower arms;
   (d) a shock absorber comprising forward and rearward portions, the forward portion being connected to at least one shock mount fixedly attached to the front portion of the force channeling tube, the shook absorber being configured to compress along a longitudinal axis that is substantially parallel to the front longitudinal axis of the force channelling tube;
   (e) a torque conversion device pivotally connected to the upper arms, the rearward portion of the shock absorber, and to the force channeling tube at or near the first intersection;
   wherein at least portions of the forces generated by movement of the rear triangle with respect to the force channeling tube and the seat tube are transmitted through the torque conversion device to the shock absorber, the at least one shock mount, and the force channeling tube.

2. The mountain bike frame of claim 1, wherein the top and bottom portions of the seat tube have top and bottom longitudinal axes associated therewith, the top longitudinal axis being configured at a steeper vertical angle than the bottom longitudinal axis.

3. The mountain bike frame of claim 1, further comprising front gussets attached to the force channeling tube at or near the first intersection.

4. The mountain bike frame of claim 1, further comprising a bottom bracket located at or near the second intersection.

5. The mountain bike frame of claim 4, wherein the bottom bracket further comprises forward and rearward bottom bracket pivots.

6. The mountain bike frame of claim 1, wherein the torque conversion device is not connected to the seat tube.

7. The mountain bike frame of claim 1, wherein the at least one shock mount is welded to the front portion of the channelling tube.

8. The mountain bike frame of claim 1, wherein the torque conversion device is pivotally connected to the upper arms behind the seat tube.

9. The mountain bike frame of claim 1, further comprising front and rear wheels operably attached thereto.

* * * * *